Patented July 18, 1939

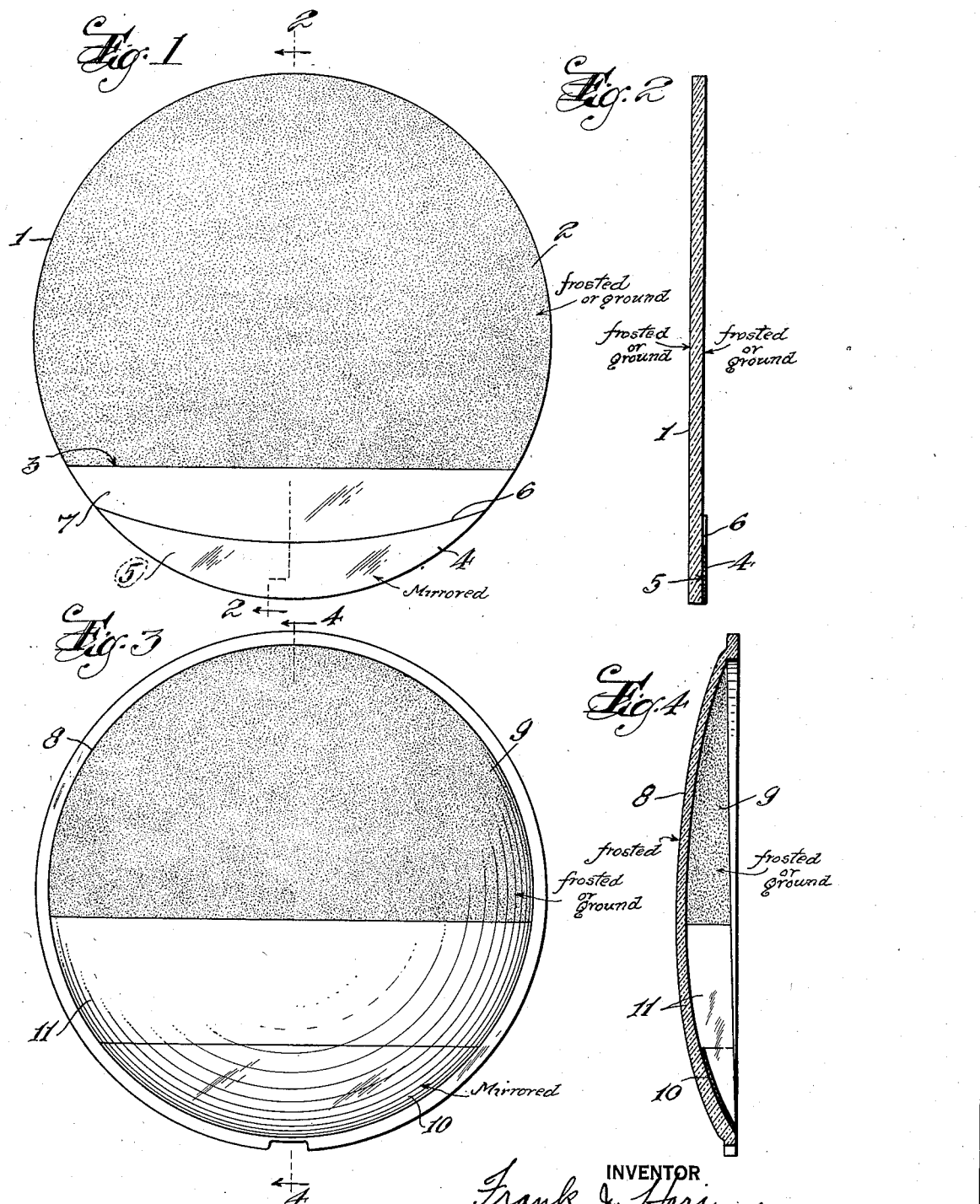

2,166,684

UNITED STATES PATENT OFFICE 2,166,684

GLARE-PREVENTIVE LENS

Frank J. Hari, Newark, N. J.

Application June 11, 1936, Serial No. 84,633

3 Claims. (Cl. 240—41.4)

This invention relates to a glare-preventive lens for headlights for vehicles in which the source of light is located in or near the focus of a reflector, one object of the invention being to provide novel and improved means for reducing or eliminating the glare from the headlight and at the same time permitting adequate light to be thrown upon the roadway sufficiently far ahead of the vehicle to insure safety in driving of the vehicle.

Another object is to provide such a lens whereby the light striking any point above the level of the source shall be diffused and a horizontal beam of unobstructed light may be projected from the points below the source onto the roadway, and the lens shall have an opaque but reflecting surface below the projected beam to prevent direct reflection of the light from the reflector of the headlight and yet enhance the direction of the light upon the roadway ahead of the vehicle.

Other objects and advantages will be brought out by the following description when read in conjunction with the accompanying drawing in which Figure 1 is a front elevation of a headlight lens embodying my invention.

Figure 2 is a transverse sectional view on the line 2—2 of Figure 1.

Figure 3 is a front elevation of a modified form of the lens and

Figure 4 is a transverse sectional view on the line 4—4 of Figure 3.

Specifically describing the embodiment of the invention shown in Figures 1 and 2, the reference character 1 designates a plate of glass or other transparent material to be secured in the front of a headlight casing in the usual way. The plate may be of any shape conforming to that of the headlight casing, but is shown as circular.

The upper portion of the plate is ground or frosted so as to be in effect translucent, as indicated at 2, the ground or frosted portion terminating at a point below the center of the lens, preferably in a straight line as indicated at 3 which extends across the lens in approximately chordal relation thereto.

The lower portion 4 of the lens has a rear opaque and a mirrored or reflecting surface 5 facing toward the front side of the lens, said opaque and mirrored portion conforming to the periphery of the lens and terminating in spaced relation to the edge 3 of the ground portion 2 in approximately parallel relation as at 6. This arrangement of the ground portion and the opaque mirrored portion leaves a clear or transparent narrow portion 7 extending across the lens from one side to the other in approximately chordal relation thereto.

In use, with the lens secured in a headlight, the ground portion 2 completely masks the source of light and diffuses the light projected above the level of the source and also diffuses a portion of the light projected below the level of the source; although the light is thrown sufficiently ahead of the vehicle and at both sides thereof to enable the operator to see the road ahead and to enable the lamp to be seen from considerable distance without glare. The light transmitted through the clear or transparent portion 7 is in the form of a horizontal narrow beam approximately rectangular in cross section and is projected ahead of the vehicle and to both sides thereof but so that no portion of the beam may cause glare in the eyes of pedestrians or drivers of other vehicles approaching the headlight. This beam of unobstructed light insures adequate illumination of the roadway for safety in driving. The opaque and mirrored portion 4, 5 prevents glare from the lower portion of the light reflector but at the same time enhances the projection of light onto the roadway.

In the modification shown in Figures 3 and 4, the structure is substantially the same except that the lens is in the form of a concavo-convex plate 8 instead of a flat plate as shown in Figures 1 and 2. The lens has an upper ground portion 9 corresponding to the portion 2, an opaque mirrored portion 10 corresponding to the portion 4, 5, and a clear or transparent portion 11 corresponding to the portion 7. The operation of this form of the invention is the same as that of the form shown in Figures 1 and 2.

While the translucent portions 2 and 9 may be formed in different ways, I prefer to produce them by grinding the surface of the material, and also preferably both sides of the plates 1 and 9 are ground.

Instead of forming the lower portion 4, 5 opaque and with a forwardly facing reflective surface, that portion of the lens may also be made translucent, for example by frosting or grinding.

The relative proportions of the translucent mirrored and transparent portions of the lenses may be varied without departing from the spirit or scope of the invention, as may also the contour of the lenses.

Having thus described my invention, what I claim is:

1. A headlight lens having its upper portion translucent to a point below the center, an opaque lower portion having a reflecting surface facing toward the front of the lens, and a transparent portion extending across the lens between the upper and lower portions.

2. A headlight lens having an upper light diffusing portion, a lower opaque portion, and a transparent portion between said upper and lower portions extending across the lens in approximately chordal relation thereto, the upper portion extending to a point below the center of the lens to mask the lamp of a headlight.

3. A headlight lens comprising a plate of transparent material having an upper light diffusing portion extending to a point below the center of the lens to mask the lamp of a headlight, a lower portion having a rear opaque light reflecting surface facing toward the front of the lens, and a transparent portion between said upper and lower portions extending across the lens in approximately chordal relation thereto.

FRANK J. HARI.